United States Patent
Naruse et al.

(10) Patent No.: US 9,986,218 B2
(45) Date of Patent: May 29, 2018

(54) ELECTRONIC APPARATUS, METHOD OF CHANGING A MOVING IMAGE DATA SECTION, AND PROGRAM

(75) Inventors: Kuniichiro Naruse, Tokyo (JP); Hisashi Hosaka, Tokyo (JP); Mitsuo Okumura, Tokyo (JP); Yukiko Akiyama, Tokyo (JP); Kosuke Kimura, Tokyo (JP); Kazuma Igari, Kanagawa (JP)

(73) Assignee: Sony Corporation, Tokyo (JP)

( * ) Notice: Subject to any disclaimer, the term of this patent is extended or adjusted under 35 U.S.C. 154(b) by 1223 days.

(21) Appl. No.: 12/511,615

(22) Filed: Jul. 29, 2009

(65) Prior Publication Data
US 2010/0054692 A1    Mar. 4, 2010

(30) Foreign Application Priority Data

Aug. 29, 2008    (JP) .................................. 2008-222915

(51) Int. Cl.
*G11B 27/00*    (2006.01)
*H04N 9/82*    (2006.01)
(Continued)

(52) U.S. Cl.
CPC ......... *H04N 9/8211* (2013.01); *G11B 27/034* (2013.01); *G11B 27/34* (2013.01); *H04N 5/781* (2013.01); *H04N 5/85* (2013.01)

(58) Field of Classification Search
CPC ... G11B 27/034; G11B 2220/90; G11B 27/34; G11B 27/105; H04N 9/8042
See application file for complete search history.

(56) References Cited

U.S. PATENT DOCUMENTS 6,608,964 B1 * 8/2003 Saito .................... G11B 27/034
                                                        386/241
7,729,598 B2    6/2010   Porter et al.
(Continued)

FOREIGN PATENT DOCUMENTS

CN         1390420 A     1/2003
CN         1893591 A     1/2007
(Continued)

OTHER PUBLICATIONS

Office Action dated Nov. 12, 2010, in China Patent Application No. 200910170978.1 (with English translation).

*Primary Examiner* — William C Vaughn, Jr.
*Assistant Examiner* — Daniel Tekle
(74) *Attorney, Agent, or Firm* — Oblon, McClelland, Maier & Neustadt, L.L.P.

(57) ABSTRACT

Disclosed is an electronic apparatus. The electronic apparatus includes a creation unit to combine first section data in moving image data with other content data to create a composite moving image content, a reproduction unit to reproduce the moving image data, an operation reception unit to receive a predetermined operation input by a user during reproduction of the moving image data, and a control unit to extract second section data including a reproduction position of the moving image data at a time when the predetermined operation input is received and control the creation unit so that the creation unit changes the first section data in the composite moving image content into the second section data, the second section data being different from the first section data.

15 Claims, 8 Drawing Sheets

(51) Int. Cl.
*G11B 27/034* (2006.01)
*G11B 27/34* (2006.01)
*H04N 5/781* (2006.01)
*H04N 5/85* (2006.01)

(56) References Cited

U.S. PATENT DOCUMENTS

| | | | | |
|---|---|---|---|---|
| 7,739,598 B2 * | 6/2010 | Porter | ................ | G06K 9/00228 382/118 |
| 2002/0157093 A1 * | 10/2002 | Akiyama | ................ | H04N 5/445 725/32 |
| 2004/0109674 A1 * | 6/2004 | Ohmori | ................ | G11B 27/034 386/253 |
| 2007/0147780 A1 * | 6/2007 | Moteki | ................ | G11B 27/034 386/241 |
| 2008/0152197 A1 * | 6/2008 | Kawada | ................ | H04N 1/2112 382/115 |

FOREIGN PATENT DOCUMENTS

| | | |
|---|---|---|
| JP | 2001-285784 | 10/2001 |
| JP | 2002-27385 | 1/2002 |
| JP | 2002-27411 | 1/2002 |
| JP | 2006-86621 | 3/2006 |
| JP | 2006-86622 | 3/2006 |
| JP | 2006-510240 | 3/2006 |
| JP | 2006-166164 | 6/2006 |
| WO | WO 2005/076188 A1 | 8/2005 |

* cited by examiner

ELECTRONIC APPARATUS, METHOD OF CHANGING A MOVING IMAGE DATA SECTION, AND PROGRAM

BACKGROUND OF THE INVENTION

1. Field of the Invention

The present invention relates to an electronic apparatus, a method of changing a moving image data section, and a program capable of creating a new moving image content by editing moving image data and still image data.

2. Description of the Related Art

In related art, there has been proposed an electronic apparatus such as a PC (Personal Computer) equipped with a function of editing and combining partial sections of a plurality of pieces of moving image data and still image data shot by a user and creating a user's own new moving image content (movie).

For example, Japanese Patent Application Laid-open No. 2001-285784 discloses an image editing processing in which when a user specifies an image stored in a hard disk or the like, the specified image is subjected to a predetermined effect processing and a content including images that are successively displayed with music prepared in advance in the background is created.

Japanese Patent Application Laid-open Nos. 2006-86621, 2006-86622, and 2006-166164 each disclose a technique in which a user selects a piece of music prepared in advance and selects a photo album in which still images as reproduction targets are stored, thereby creating a play list that indicates, with the music, a slide show of the still images that have been subjected to an effect processing so that the still images match the mood of the music.

SUMMARY OF THE INVENTION

Incidentally, for creating the user's own moving image content as described above, the user is required to select a section to be used from the moving image data as a material. Further, after the user selects the section, the user may want to change a section of the moving image data used in the created moving image content into another section in some cases. To change the section by an electronic apparatus, it can be considered to display a GUI that causes the user to drag a pointer having a width corresponding to a length of a section used for the moving image content to be created, to thereby select the section from the entire reproduction sections of the moving image data as the material, for example.

However, in a case where the total reproduction time period of the moving image data as the material is long, when the section is indicated by the pointer, the width of the pointer becomes too small. Accordingly, it becomes difficult for the user to perform the drag operation, which makes it difficult to change the section.

In view of the above-mentioned circumstances, it is desirable to provide an electronic apparatus, a method of changing a moving image data section, and a program capable of adjusting, with a simple operation, the section of the moving image data which is used for the moving image content created based on the moving image data and the still image data.

According to an embodiment, there is provided an electronic apparatus including a creation means, a reproduction means, an operation reception means, and a control means.

The creation means combines first section data in moving image data with other content data to create a composite moving image content.

The reproduction means reproduces the moving image data.

The operation reception means receives a predetermined operation input by a user during reproduction of the moving image data.

The control means extracts second section data including a reproduction position of the moving image data at a time when the predetermined operation input is received and controls the creation means so that the creation means changes the first section data in the composite moving image content into the second section data, the second section data being different from the first section data.

Herein, examples of the electronic apparatus include a PC (Personal Computer), a television apparatus, a recording/reproducing apparatus that uses a recording medium such as an HDD (Hard Disk Drive), a DVD, and a BD (Blu-ray disc), a digital video camera, portable AV equipment, a mobile phone, a game machine, and a robot apparatus. The other content data includes the whole or a part of other moving image data, a still image, a sound (music) content, or the like. The predetermined operation input refers to, for example, a click operation or a pressing operation with respect to a GUI such as an icon and a button, but is not limited thereto. The "reproduction" includes at least a processing of decoding the moving image data and outputting it to a display unit that is incorporated in or externally connected to the electronic apparatus.

With this structure, the electronic apparatus can newly select a section used for the composite moving image content from the moving image data with reference to a time point when the operation input is received from the user during the reproduction of the moving image data.

Therefore, only by inputting the operation, the user can change the first section data into the second section data including the reproduction position at the time when the operation input is received while confirming scenes of the moving image data during the reproduction. That is, the user can easily adjust the sections used of the moving image data in the composite moving image content.

The control means may extract, as the second section data, a predetermined section of the moving image data, in which the reproduction position of the moving image data at the time when the operation input is received is set at a start point of the predetermined section.

With this structure, the user can easily select the second section with the reproduction position of the moving image data at the time when the predetermined operation input is performed being set at the start point. For example, the user can select the second section so that an exciting event is positively included, from scenes in which the exciting event is held at the beginning.

The control means may extract, as the second section data, a predetermined section of the moving image data, in which the reproduction position of the moving image data at the time when the operation input is received is set at an end point of the predetermined section.

With this structure, the user can easily select the second section with the reproduction position of the moving image data at the time when the predetermined operation input is performed being set at the end point. For example, the user can select the second section so that an exciting event is positively included, from scenes in which the exciting event is held at the end.

The control means may extract, as the second section data, a predetermined section of the moving image data, in which the reproduction position of the moving image data at the time when the operation input is received is set at a midpoint of the predetermined section.

With this structure, the user can easily select the second section with the reproduction position of the moving image data at the time when the predetermined operation input is performed being set at the midpoint. For example, the user can select the second section so that an exciting event is positively included, from scenes in which the exciting event is held at the middle thereof.

The reproduction means may be capable of performing frame advance of the moving image data, and the operation reception means may receive the operation input during the frame advance of the moving image data.

With this structure, the user can minutely reselect the second section by inputting the operation while confirming the moving image data frame by frame through the frame advance.

The electronic apparatus may further include a detection means for detecting a person's face from the moving image data.

In this case, the control means may create, at the time when the operation input is received, display information that indicates the reproduction position in an entire section of the moving image data and a section including the person's face detected, and output the display information.

With this structure, the user can confirm the section including the person's face in the moving image data, when the user reselects the second section, with the result that the convenience is improved. For example, the user can input the operation so that the section including the person's face is included in the second section.

The electronic apparatus may further include a detection means for detecting a person's voice from the moving image data.

In this case, the control means may create, at the time when the operation input is received, display information that indicates the reproduction position in an entire section of the moving image data and a section including the person's voice detected, and output the display information.

With this structure, the user can confirm the section including the person's voice in the moving image data, when the user reselects the second section, with the result that the convenience is improved. For example, the user can input the operation so that the section including the person's voice is included in the second section.

The control means may create, at the time when the operation input is received, thumbnail images of the moving image data at a start point, a midpoint, and an end point of the second section, and output the thumbnail images.

With this structure, the user can confirm the scenes at the start point, the midpoint, and the end point of the section reselected as the second section by using the thumbnail images. As a result, the user can confirm whether the desired scene is included in the second section or not by using the thumbnail images, which improves the convenience.

According to another embodiment, there is provided a method of changing a moving image data section. The method of changing a moving image data section includes combining first section data in moving image data with other content data to create a composite moving image content.

The moving image data is reproduced.

A predetermined operation input by a user during reproduction of the moving image data is received.

Second section data including a reproduction position of the moving image data at a time when the predetermined operation input is received is extracted. The second section data is different from the first section data. The first section data in the composite moving image content is changed into the second section data.

With this method, the user can easily make an adjustment of the sections to be used in the moving image data in the composite moving image content.

According to another embodiment, there is provided a program to cause an electronic apparatus to execute a creation step, a reproduction step, an operation reception step, an extraction step and a change step.

In the creation step, first section data in moving image data is combined with other content data to create a composite moving image content.

In the reproduction step, the moving image data is reproduced.

In the operation reception step, a predetermined operation input by a user is received during reproduction of the moving image data.

In the extraction step, second section data including a reproduction position of the moving image data at a time when the predetermined operation input is received is extracted. The second section data is different from the first section data.

In the change step, the first section data in the composite moving image content is changed into the second section data.

With this program, the user can easily make an adjustment of the sections used of the moving image data in the composite moving image content.

According to another embodiment, there is provided an electronic apparatus including a creation unit, a reproduction unit, an operation unit, and a control unit. The creation unit combines first section data in moving image data with other content data to create a composite moving image content. The reproduction unit reproduces the moving image data. The operation reception unit receives a predetermined operation input by a user during reproduction of the moving image data. The control unit extracts second section data including a reproduction position of the moving image data at a time when the predetermined operation input is received and controls the creation unit so that the creation unit changes the first section data in the composite moving image content into the second section data, the second section data being different from the first section data.

As described above, according to the embodiments, it is possible to adjust the sections of the moving image data used in the moving image content created based on the moving image data and the still image data with the simple operations.

These and other objects, features and advantages of the present invention will become more apparent in light of the following detailed description of best mode embodiments thereof, as illustrated in the accompanying drawings.

DESCRIPTION OF PREFERRED EMBODIMENTS

Hereinafter, an embodiment of the present invention will be described with reference to the drawings.

(Hardware Structure of PC)

Figure 1:
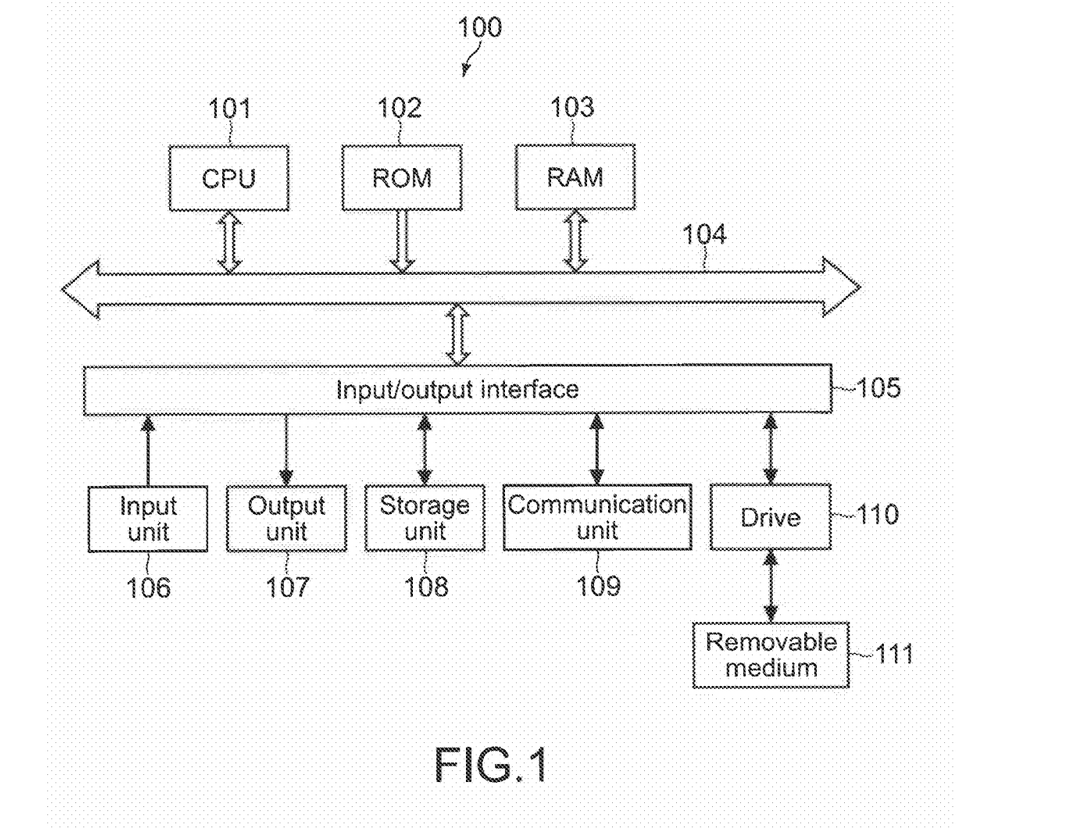
FIG. 1 is a diagram showing a hardware structure of a PC according to an embodiment of the present invention.

FIG. 1 is a diagram showing a hardware structure of a PC according to an embodiment of the present invention.

As shown in FIG. 1, a PC 100 includes a CPU (Central Processing Unit) 101, a ROM (Read Only Memory) 102, and a RAM (Random Access Memory) 103, which are connected with one other via a bus 104.

The PC 100 further includes an input/output interface 105, and an input unit 106, an output unit 107, a storage unit 108, a communication unit 109, and a drive 110, which are connected with the input/output interface 105.

The CPU 101 accesses the RAM 103 and the like as needed, and performs overall control on whole blocks of the PC 100 while performing various computation processings. The ROM 102 is a non-volatile memory in which an OS, a program, and a firmware such as various parameters that are run by the CPU 101 are fixedly stored. The RAM 103 is used for a work area or the like for the CPU 101. In the RAM 103, various running programs and various data items in processing are temporarily stored.

The input unit 106 is, for example, a keyboard, a mouse, a touch pad, and a button, and receives various operations by a user and outputs input operation signals to the CPU 101. The output unit 107 is a display unit of an OEL (Organic Electro-Luminescence) display or an LCD (Liquid Crystal Display) for outputting video signals of various contents, or a speaker for outputting audio signals of various contents, for example.

The storage unit 108 is, for example, a non-volatile memory such as an HDD and a flush memory. The storage unit 108 stores, in a built-in hard disk or a memory device, the OS, various programs, applications including a movie creation application to be described later, and various data items including various moving images and still images as materials of the movie and a movie created. Further, the storage unit 108 reads the programs and data items to the RAM 103.

The communication unit 109 includes a network interface card, a modem, and the like, and performs a communication processing with another apparatus via a network such as the Internet. For example, the communication unit 109 can receive a program or data from another apparatus via the network.

Into the drive 110, a removable medium 111 is loaded. The drive 110 reads a program or data recorded on each removable medium 111, and stores the program or data in the storage unit 108 and reproduces the program or data from the output unit 107 through the input/output interface 105.

The removable medium ill is a medium, for example, an optical disk such as a DVD, a BD, and a CD, or a semiconductor memory such as a memory card.

(Function of Movie Creation Application)

Figure 2:
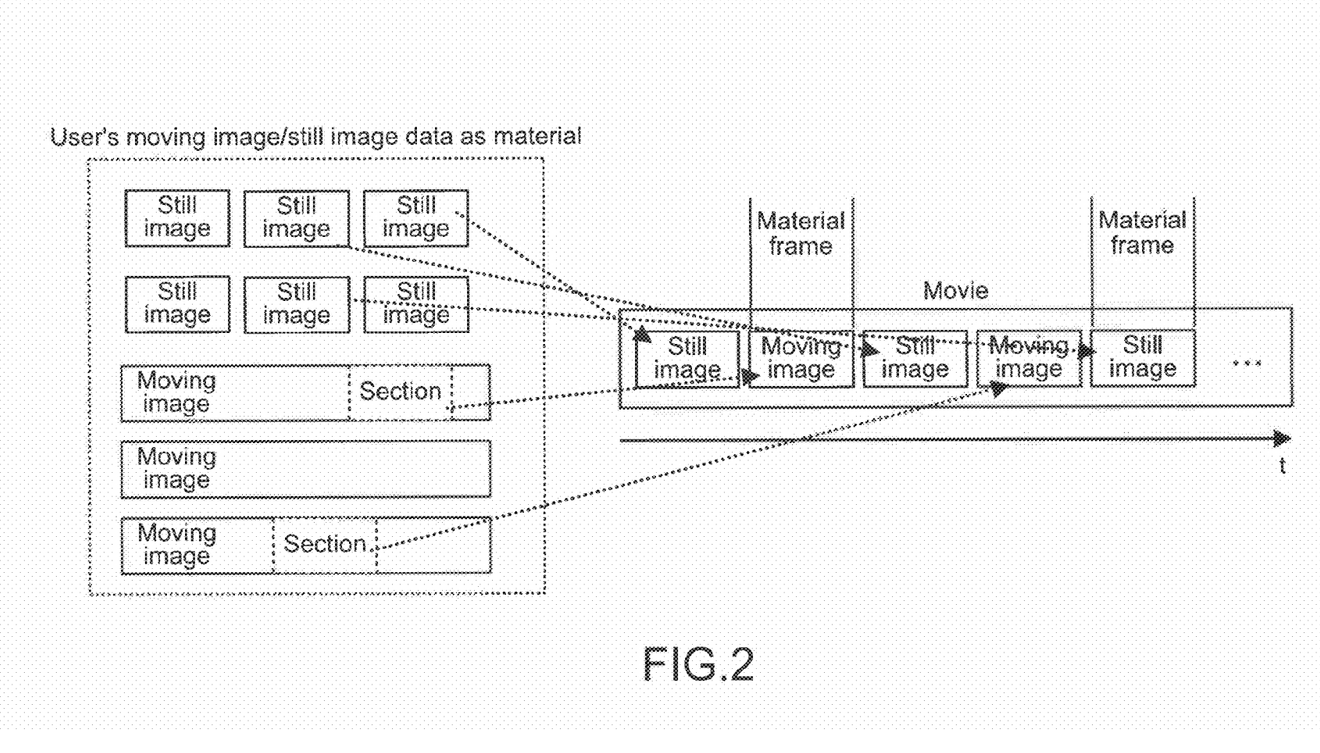
FIG. 2 is a diagram for explaining a function of an application provided to the PC according to the embodiment of the present invention.
Figure 3:
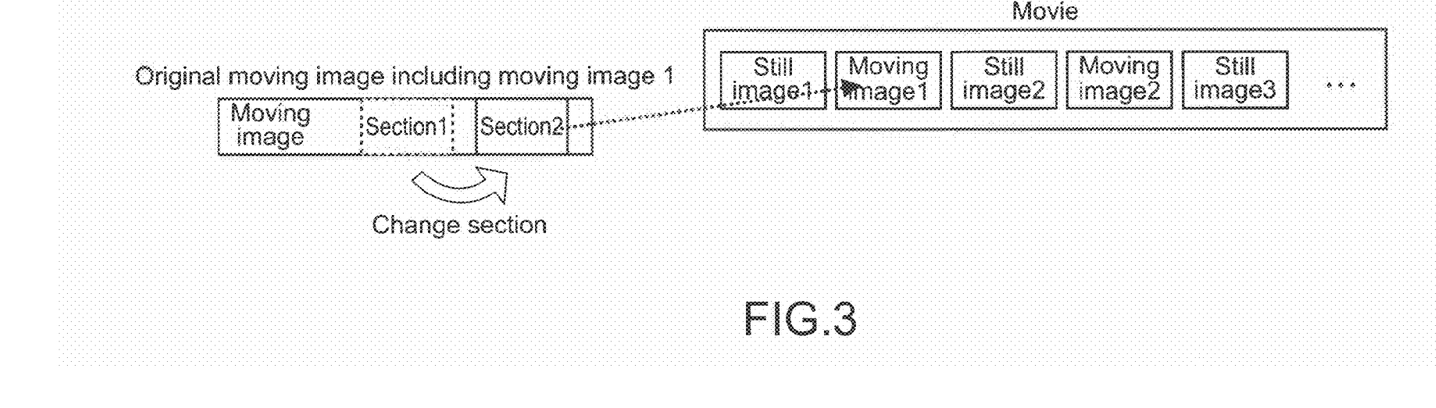
FIG. 3 is a diagram for explaining a function of the application provided to the PC according to the embodiment of the present invention.

Next, a description will be given on functions of the movie creation application equipped in the PC 100. FIGS. 2 and 3 are diagrams for explaining the functions of the movie creation application.

As shown in FIG. 2, the PC 100 includes an application (hereinafter, referred to as movie creation application) for creating a user's own moving image (movie) based on materials such as a moving image file and a still image file that are shot by the user and stored in the storage unit 108, and a music file.

The movie creation application includes a plurality of template files that correspond to various subjects. The subject refers to a detailed classification set in categories such as trips, kids, sports, and events. Each of the categories includes a plurality of kinds of subjects whose tastes are different, and each of the subjects includes a template file.

The template file is a file in which pieces of BGM, a plurality of material frames, one or more effect frames, and one or more transition frames are predefined in accordance with a time code indicating reproduction time from the head thereof.

The BGM is music that is set so as to match a subject of a template file and output at a time of image reproduction. Typically, the total reproduction time period of the template file corresponds to a reproduction time period of a piece of BGM, but a plurality of pieces of BGM may correspond to one template file, or the same music may be repeatedly reproduced in one template file.

The material frame is a box (container) for defining, in the entire movie, a position and a length of a section for inserting a file of a moving image or a still image as the material. The material frame is disposed so as to correspond to a timing when a tempo of the BGM is changed, for example. The length of the section is several seconds, for example, but is not limited to this. In the material frame, whether the moving image or the still image is inserted is predefined as metadata.

The effect frame defines effects of zooming in, setting the color of the image to sepia, and the like for each material frame.

The transition frame defines a transition type of the image when the material frame is changed at a timing when a predetermined material frame defined on the template file is changed to the next material frame. The transition type refers to a fade-in, a fade-out, and appearing from a left side of a screen and disappearing to a right side thereof, for example. The effect frame and the transition frame that match the subject and taste of the template file are adopted.

When the user specifies one of the template files as described above and gives an instruction to create the moving image data, the movie creation application detects, from files held by the user, a still image file and a moving image file that fit into the material frames and inserts them into the material frames, as shown in FIG. 2. Thus, the moving image data (movie) to which an effective direction by the BGM, effect, transition, and the like is added in line with the subject of the template file is created. In the case where the moving image is inserted in the material frame, a part of sections used for the movie is selected from the moving image by the user.

The movie creation application also has a function of adjusting the created movie based on an operation input by the user. Specifically, as the adjusting function, changing of the part of the section of the moving image that is inserted in a certain material frame into another section without changing the length of the section is included.

As shown in FIG. 3, for example, the movie creation application can change a section 1 that is inserted in a material frame of a moving image 1 in a template of a movie into a section 2 based on an operation input by the user. This operation will be described later in detail.

(Operation of PC)

Next, a description will be given on the operation of the PC 100 in this embodiment, mainly on an operation for changing the section. In the following description, although the movie creation application is regarded as a main part for the operation, the entire operation is executed under control of the CPU 101.

Figure 4:
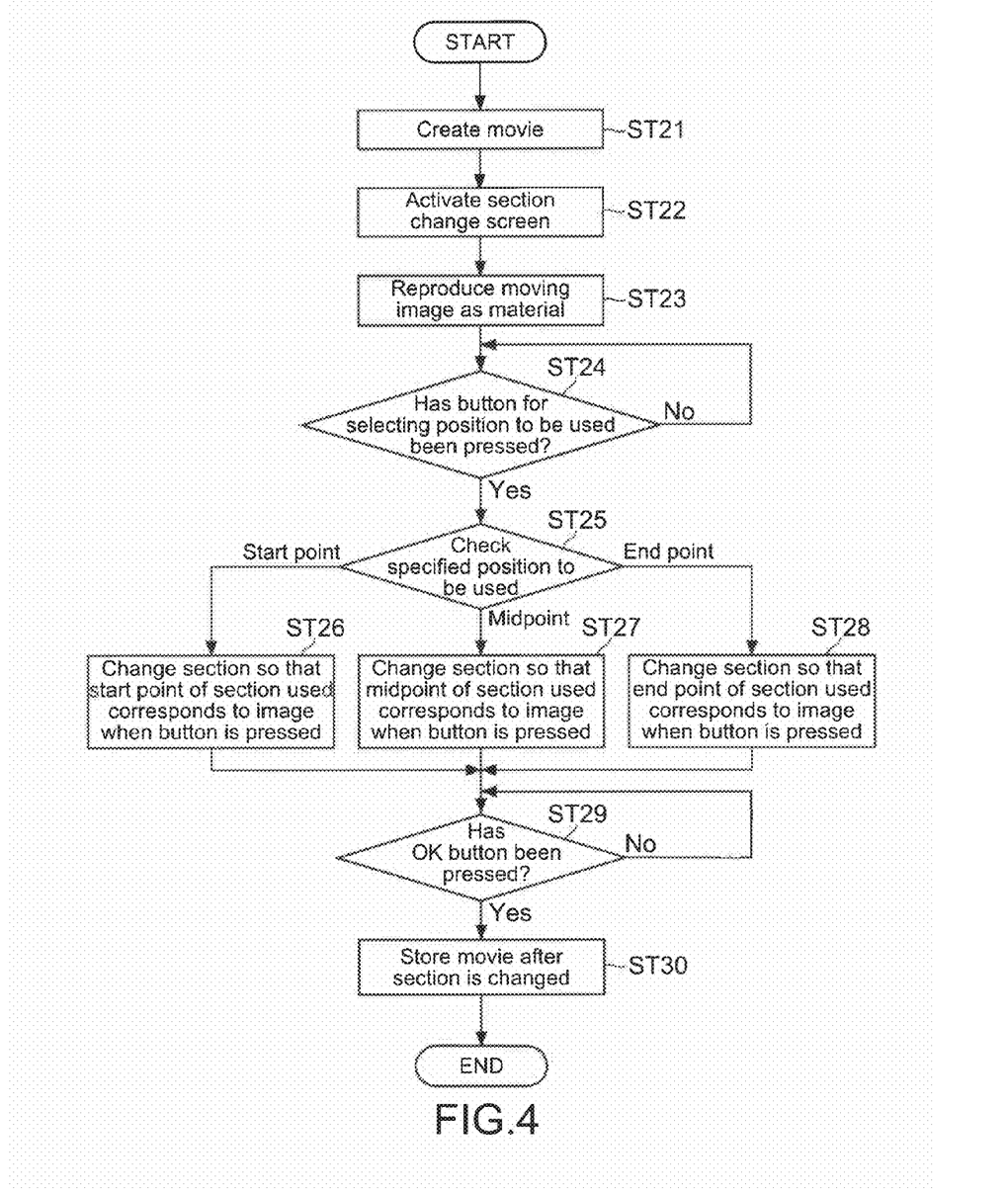
FIG. 4 is a flowchart showing a sequence of operations from a movie creation to a change of a section of the moving image that are performed by the PC according to the embodiment of the present invention.

FIG. 4 is a flowchart showing an operation sequence from a movie creation to a section change of the moving image by the PC 100.

As shown in FIG. 4, first, the movie creation application of the PC 100 creates the movie by the method described with reference to FIG. 2 (Step 21). Subsequently, the movie creation application activates a section change screen including a GUI for changing the section of the moving image used for the movie based on an operation input by the user, e.g., pressing of a button (Step 22).

Figure 5:
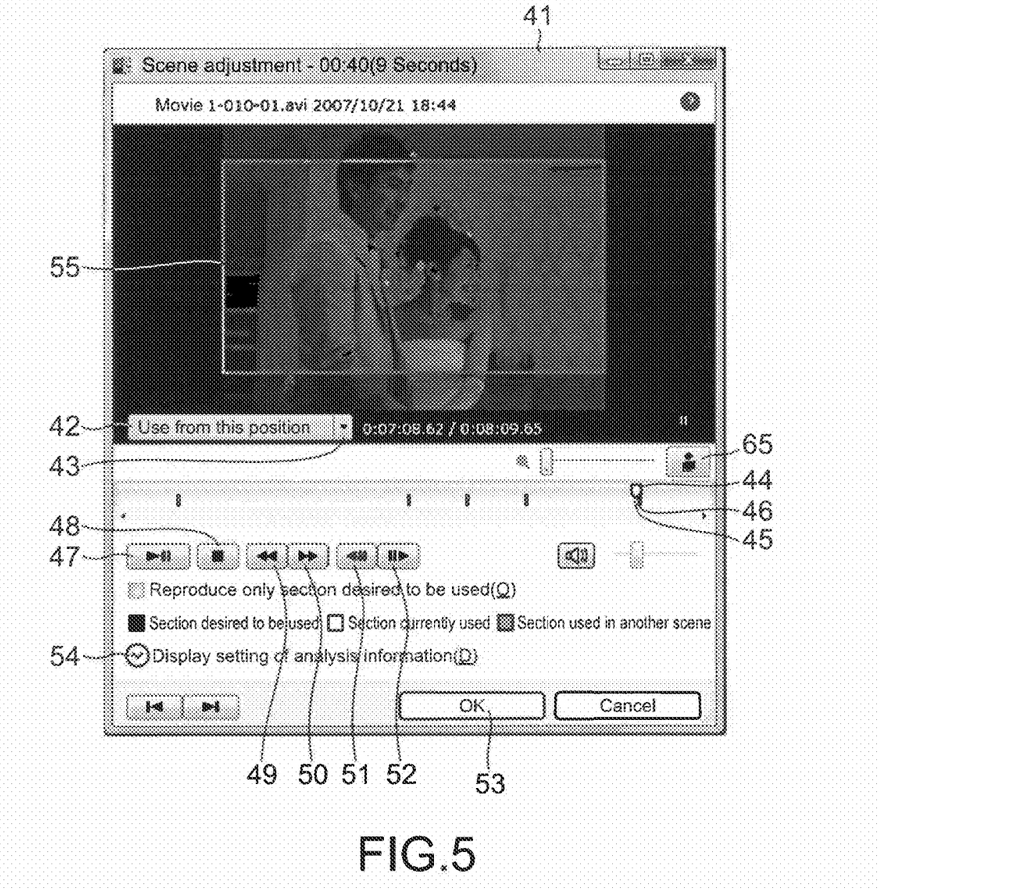
FIG. 5 is a diagram showing an example of a section change screen in the embodiment of the present invention.

FIG. 5 is a diagram showing an example of the section change screen.

As shown in FIG. 5, on an upper portion of a section change screen 41, a moving image reproduction area 55 for reproducing the moving image including a partial section used for a created movie is displayed. Below the moving image reproduction area 55, there are displayed buttons for giving an instruction to perform various reproduction processings of the above moving image, such as a reproduction/pause button 47, a stop button 48, a fast rewind button 49, a fast forward button 50, a frame return button 51, and a frame advance button 52.

Between the various buttons and the moving image reproduction area 55, a pointer 44 that indicates a position where the moving image is currently reproduced on the moving image reproduction area 55 is displayed. In addition to the pointer 44, position display bars 45 and 46 are displayed. The position display bars 45 and 46 indicate positions of a section currently used for the movie and a section desired to be used for the movie (section desired to be changed) in the entire moving image. Further, another position display bar that indicates a section used in another scene of the created movie is also displayed.

On an upper right portion of the areas where the pointer 44 and the position display bars 45 and 46 are displayed, a thumbnail display button 65 for selecting whether a thumbnail image (to be described later) is displayed or not is displayed. On a lower left portion of the section change screen 41, an analysis information display button 54 for setting whether analysis information (to be described later) is displayed or not is displayed. On a lower right portion of the section change screen 41, an OK button 53 for deciding a section change of the moving image to be used is displayed.

On a lower left portion of the moving image reproduction area 55, a use position selection button 42 for setting the position of the moving image currently reproduced at one of a start point, a midpoint, or an end point of a changed section is displayed. The use position selection button 42 has a pull down button 43 for selecting one of the start point, the midpoint, or the end point.

Figure 6:
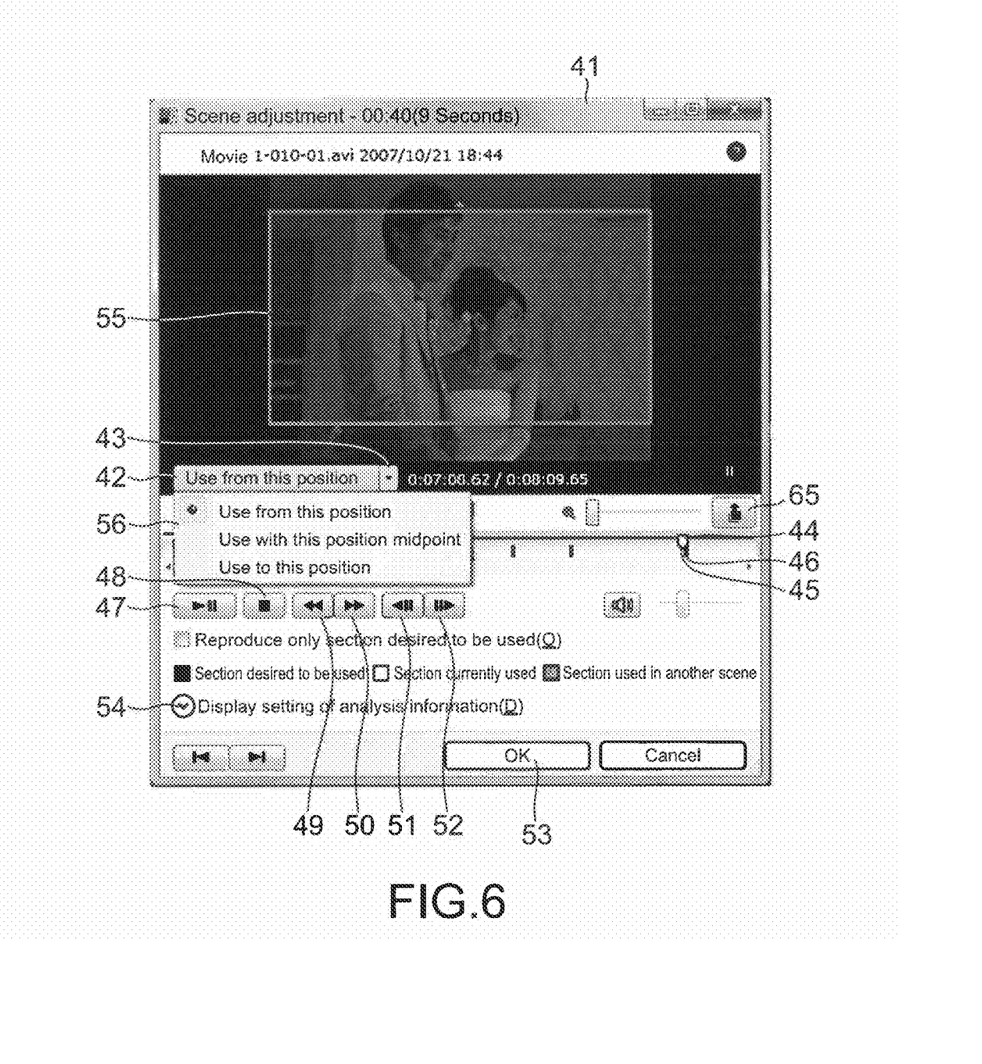
FIG. 6 is a diagram showing the section change screen when a pull down button is pressed in the embodiment of the present invention.

FIG. 6 is a diagram showing an example of the section change screen 41 when the pull down button 43 is pressed. As shown in FIG. 6, when the pull down button 43 is pressed, the movie creation application causes display of a selection box 56 for selecting one from alternatives of "use moving image from this position", "use moving image with this position being midpoint", and "use moving image to this position". In FIG. 6, a case where an alternative of "use moving image from this position" is selected is shown. By selecting one of the alternatives, the reproduction position of the moving image when the use position selection button 42 is pressed is set at the start point, the midpoint, or the end point of the changed section.

Returning to FIG. 4, the movie creation application reproduces the moving image as the material based on an operation with respect to the reproduction/pause button 47 by the user with the section change screen 41 being displayed (Step 23). Subsequently, the movie creation application checks whether the use position selection button 42 is pressed (Step 24).

Subsequently, the movie creation application checks which of the start point, the mid point, or the end point the use position selection button 42 is set to with the pull down button 43 (Step 25).

In a case where the use position selection button 42 is set to the start point, the movie creation application changes a partial section of the moving image inserted in the material frame so that the start point of the section after a change is set at the reproduction position of the moving image at a time when the use position selection button 42 is pressed (Step 26). That is, the movie creation application newly extracts, from the moving image, a section whose start point corresponds to the above reproduction position and which has a predetermined time length, and inserts data of the extracted section in the material frame of the created movie, in which the section before a change has been inserted.

In a case where the use position selection button 42 is set to the midpoint, the movie creation application changes a partial section of the moving image inserted in the material frame so that the midpoint of the section after a change is set at the reproduction position of the moving image at the time when the use position selection button 42 is pressed (Step 27).

In a case where the use position selection button 42 is set to the end point, the movie creation application changes a partial section of the moving image inserted in the material frame so that the end point of the section after a change is set at the reproduction position of the moving image at the time when the use position selection button 42 is pressed (Step 28).

Subsequently, the movie creation application checks whether the OK button 53 is pressed after the use position selection button 42 is pressed (Step 29). When the OK button 53 is pressed (Yes), the movie creation application overwrites and saves, in the storage unit 108, the movie in which the section of the moving image to be used is changed (Step 30). At this time, the movie creation application may automatically reproduce the movie after the section is changed and cause the user to check whether a movie after the section is changed is completed as the user wishes.

The use position selection button 42 may not necessarily be pressed during reproduction of the moving image by using the reproduction/pause button 47. For example, the user may pause the reproduction of the moving image by using the reproduction/pause button 47, perform frame forward on the moving image by using the frame forward button 52, and then press the use position selection button 42. By this operation, the user can more minutely set the start point, the midpoint, or the end point of the section after the change.

Figure 7:
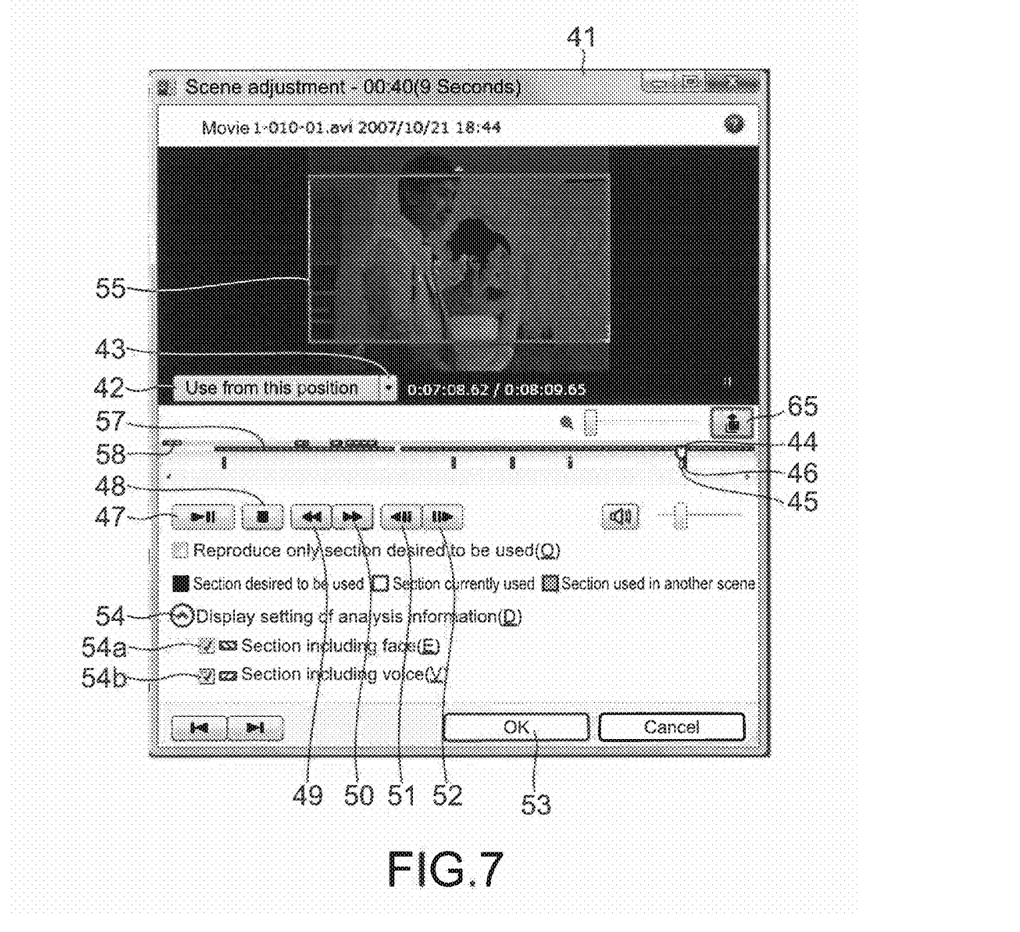
FIG. 7 is a diagram showing an example of a display screen of analysis information in the embodiment of the present invention.

During the above operation, when the analysis information display button 54 is pressed and a predetermined setting is performed, the movie creation application displays, as analysis information of the moving image, positions of a section in which a person's face is included and a section in which person's voice is included in the moving image. FIG. 7 is a diagram showing an example of a screen in which the analysis information is displayed.

As shown in FIG. 7, when the analysis information display button 54 is pressed, the movie creation application displays check boxes 54a and 54b for selecting whether or not the position of the section including the person's face and the position of the section including the person's voice in the moving image are respectively displayed.

When the check boxes 54a and 54b are checked by the user, the movie creation application displays position display bars 57 and 58 that respectively indicate positions of the section including the person's face and the section including the person's voice in the moving image above the pointer 44. FIG. 7 shows a case where most of the moving image has sections including the person's face and several parts in a first half of the moving image have sections including the person's voice.

The movie creation application previously detects a section including the person's face and a section including the person's voice from the moving image as the material, and causes the position display bars 57 and 58 to be displayed immediately when the check boxes 54a and 54b are checked.

As a method of detecting the section including the person's face, the movie creation application can use a method in which data indicating face features such as a shape (aspect ratio), a color (flesh color), and positions of eyes and a nose is stored, and a subject that matches the data is judged as the person's face.

As a method of detecting the section including the person's voice, the movie creation application can use a method in which data indicating voice features such as sound power, a sound duration time, and a sound waveform is stored, and a sound section that match the data is judged as the section including the person's voice.

The PC 100 may have the function of detecting the face and the voice, not as one of the functions of the movie creation application but as another application dedicated thereto.

The positions of the position display bars 57 and 58 can help the user to change the section. For example, the user can operate the use position selection button 42 so that the section including the person's face and the section including the person's voice are included in the section after the change.

As described above, according to this embodiment, the movie creation application can easily change the partial section of the moving image that is used for the movie, with reference to the reproduction position of the moving image at the time when the use position selection button 42 is pressed. In particular, as compared to a case where a bar or a pointer indicating the position of the section is dragged to change the section, the section change processing is completed only by pressing the use position selection button 42, which can enhance convenience for the user.

In addition, the movie creation application can select the reproduction position of the moving image at the time when the use position selection button 42 is pressed from among the start point, the midpoint, and the end point of the section after the change, with the result that the convenience of the user can be improved.

For example, by selecting the start point with the pull down button 43, the user can select, from scenes in which an exciting event is held at the beginning, the section after the change so that the exciting event is positively included therein.

Further, by selecting the end point with the pull down button 43, the user can select, from scenes in which an exciting event is held at the end, a second section so that the exciting event is positively included therein.

Further, by selecting the midpoint with the pull down button 43, the user can select, from scenes in which an exciting event is held in the middle thereof, the second section so that the exciting event is positively included therein.

Modified Example

The present invention is not limited to only the above embodiment, and can be variously modified without departing from the gist of the present invention.

In the above embodiment, the movie creation application determines the section of the moving image after the change based on the time point when the use position selection button 42 is pressed. Alternatively, the moving creation application may determine the section after the change by using a thumbnail image of the moving image.

Figure 8:
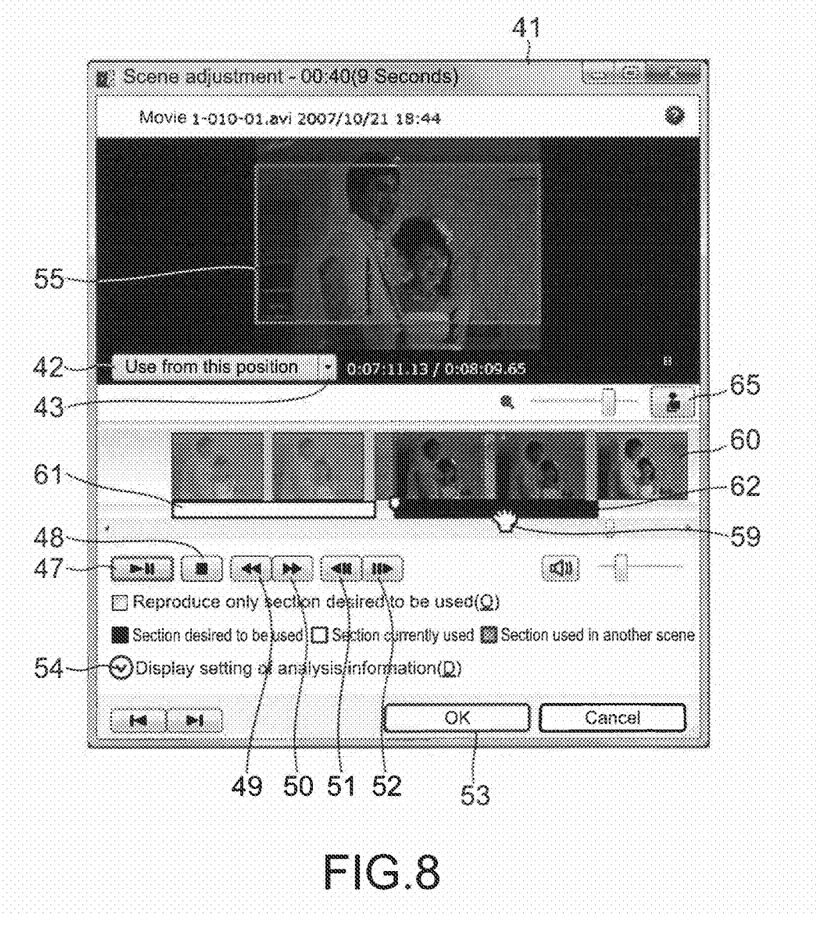
FIG. 8 is a diagram showing an example of the section change screen when the PC changes a section by using thumbnail images in another embodiment of the present invention.

FIG. 8 is a diagram showing an example of the section change screen 41 in a case where the section is changed by using a thumbnail image.

As shown in FIG. 8, when the thumbnail display button 65 is pressed, the movie creation application causes thumbnail images 60 of frames corresponding to the sections currently used in the movie and the sections desired to be used (sections desired to be changed) out of the moving images, to be displayed. As the thumbnail images of the sections desired to be used, three thumbnail images which are disposed at the start point, the midpoint, and the end point of the moving image, respectively, are displayed. The thumbnail images of the sections currently used in the movie are displayed with these thumbnail images being shaded so that they can be distinguished from the thumbnail images of the sections desired to be used, for example.

Below those thumbnail images 60, position display bars 61 and 62 are displayed. The position display bar 61 indicates a position of the section currently used in the movie in the total reproduction time period of the moving image. The position display bar 62 indicates a position of the section desired to be used in the movie. By dragging the position display bar 62 with a pointer 59, the user can select the sections after the change. The movie creation application causes the thumbnail images 60 at the start point, the midpoint, and the end point to be changed, depending on the drag operation by the user.

The movie creation application creates the thumbnail images from the moving images as the material in association with a time code before the movie is created, and immediately causes the thumbnail images to be displayed when the thumbnail display button 65 is pressed.

As a result, the user can select the section to be used in the movie after the change from among the moving images while confirming the three points of the start point, the midpoint, and the end point at the same time. In other words, the user confirms a range of the section after the change and an outline thereof, and at the same time, the user can easily select the section after the change.

In the example shown in FIG. 8, five thumbnail images are displayed in total, but the movie creation application may display a larger number of thumbnail images having shorter time intervals including the start point, the midpoint, and the end point. Further, in a case where one thumbnail image is selected from among the larger number of thumbnail images, the movie creation application may set a position corresponding to the selected thumbnail image at the start point, the midpoint, or the end point of the section after the change.

Furthermore, in the case where the section is changed by the drag operation of the position display bar 62, the movie creation application may have a function of laterally extending a display area of the total reproduction time period of the moving image that includes the position display bar 62. With this function, it can be prevented that the width of the display bar 62 is reduced due to the long total reproduction time period of the moving image as the material and the drag operation becomes difficult.

In the above embodiment, the movie creation application causes selection of the three points of the start point, the midpoint, and the end point of the section after the change by using the use position selection button 42. But, the positions selected with the use position selection button 42 are not limited to the three positions. Four or more positions may instead be selected.

In the above embodiment, the movie creation application changes the used section of the moving image in the movie on the section change screen 41. Further, the movie creation application may change the used section of the sound in the movie in the same way. That is, in the case where the use position selection button 42 is pressed during reproduction of the music (BGM) used in the movie, the movie creation application may determine the section after the change with reference to the reproduction position of the music at the time when the button is pressed.

In the above embodiment, the various functions and steps that can be executed by the movie creation application may be implemented by one application or by a plurality of applications. In addition, the movie creation application may partly or entirely be implemented by the hardware.

In the above embodiment, the present invention is applied to the PC. In addition, the present invention may also be applied to, for example, a television apparatus and a recording/reproducing apparatus that uses a recording medium such as an HDD, a DVD, and a BD. In addition, the present invention may also be applied to other electronic apparatuses such as a digital still camera, a digital video camera, portable AV equipment, a mobile phone, a game machine, a robot apparatus, a PDA (Personal Digital Assistant), an electronic dictionary, and a car navigation system.

The present application contains subject matter related to that disclosed in Japanese Priority Patent Application JP 2008-222915 filed in the Japan Patent Office on Aug. 29, 2008, the entire content of which is hereby incorporated by reference.

What is claimed is:

1. An electronic apparatus, comprising:
   circuitry configured to:
   combine a first section of a moving image with other content to create a composite moving image content;
   receive an operation input by a user;
   detect a current reproduction position of the composite moving image content displayed on a display when the operation input by the user is received;
   newly extract a second section, that is different from the first section, from the moving image based upon an extraction position corresponding to the operation input by the user and the current reproduction position of the composite moving image content, the second section having a predetermined length; and
   insert the second section from the moving image into the composite moving image content,
   wherein the operation input by the user includes specifying the extraction position for extracting the second section from the moving image from a plurality of predetermined extraction positions included in a drop down menu.

2. The electronic apparatus according to claim 1, wherein the circuitry is configured to:
   extract, as the second section, a predetermined section of the moving image, having a start point that corresponds to the current reproduction position, and
   insert the predetermined section into the composite moving image so as to replace the first section in the composite moving image.

3. The electronic apparatus according to claim 1, wherein the circuitry is configured to:
   extract, as the second section, a predetermined section of the moving image, having an end point that corresponds to the current reproduction position, and
   insert the predetermined section into the composite moving image so as to replace the first section in the composite moving image.

4. The electronic apparatus according to claim 1, wherein the circuitry is configured to:
   extract, as the second section, a predetermined section of the moving image, having a midpoint that corresponds to the current reproduction position, and
   insert the predetermined section into the composite moving image so as to replace the first section in the composite moving image.

5. The electronic apparatus according to claim 1, wherein the circuitry is configured to:
   perform frame advance of the displayed composite moving image content, and
   receive the operation input by the user during the frame advance of the displayed composite moving image content.

6. The electronic apparatus according to claim 1, wherein the circuitry is configured to:
   detect a person's face from data corresponding to the composite moving image content,
   create, when the operation input by the user is received, display information that indicates entire sections of the composite moving image content that include the person's face, and
   output, on the display, the display information.

7. The electronic apparatus according to claim 1, wherein the circuitry is configured to:
   detect a person's voice from data corresponding to the composite moving image content, create, when the operation input by the user is received, display information that indicates entire sections of the composite moving image content that include the person's voice, and output, on the display, the display information.

8. The electronic apparatus according to claim 1, wherein the circuitry is configured to:

create, when the operation input by the user is received, thumbnail images of the moving image at a start point, a midpoint, and an end point of the second section, and output, on the display, the thumbnail images.

9. The electronic apparatus according to claim 1, wherein the circuitry is configured to display, on the display, a current position of playback of the displayed composite moving image content.

10. The electronic apparatus according to claim 9, wherein the circuitry is configured to display, on the display, positions of a section in which a person's face is included and positions of a section in which a person's voice is included relative to the current position of playback of the displayed composite moving image content.

11. The electronic apparatus according to claim 10, wherein the circuitry is configured to display, on the display, the positions of the section in which the person's face is included and the positions of the section in which the person's voice is included in response to another operation input by the user.

12. The electronic apparatus according to claim 1, wherein the predetermined length of the second section is a same length as the first section.

13. A method of changing a moving image section, comprising:

combining a first section of a moving image with other content to create a composite moving image content;

receiving an operation input by a user;

detecting a current reproduction position of the composite moving image content displayed on a display when the operation input by the user is received;

newly extracting, using circuitry, a second section, that is different from the first section, from the moving image based upon an extraction position corresponding to the operation input by the user and the current reproduction position of the composite moving image content, the second section having a predetermined length; and insert the second section from the moving image into the composite moving image content, wherein the operation input by the user includes specifying the extraction position for extracting the second section from the moving image from a plurality of predetermined extraction positions included in a drop down menu.

14. A non-transitory computer readable medium encoded with a program to cause an electronic apparatus to execute a method comprising:

combining a first section of a moving image with other content to create a composite moving image content;

receiving an operation input by a user;

detecting a current reproduction position of the composite moving image content displayed on a display when the operation input by the user is received;

newly extracting, using circuitry, a second section, that is different from the first section, from the moving image based upon an extraction position corresponding to the operation input by the user and the current reproduction position of the composite moving image content, the second section having a predetermined length; and insert the second section from the moving image into the composite moving image content, wherein the operation input by the user includes specifying the extraction position for extracting the second section from the moving image from a plurality of predetermined extraction positions included in a drop down menu.

15. An electronic apparatus, comprising:

a creation unit to combine a first section of a moving image with other content to create a composite moving image content;

an operation reception unit to receive an operation input by a user; and a control unit to:

detect a current reproduction position of the composite moving image content displayed on a display when the operation input by the user is received, newly extract a second section, that is different from the first section, from the moving image based upon an extraction position corresponding to the operation input by the user and the current reproduction position of the composite moving image content, the second section having a predetermined length, and insert the second section from the moving image into the composite moving image content, wherein the operation input by the user includes specifying the extraction position for extracting the second section from the moving image from a plurality of predetermined extraction positions included in a drop down menu.

* * * * *